Figure 3:
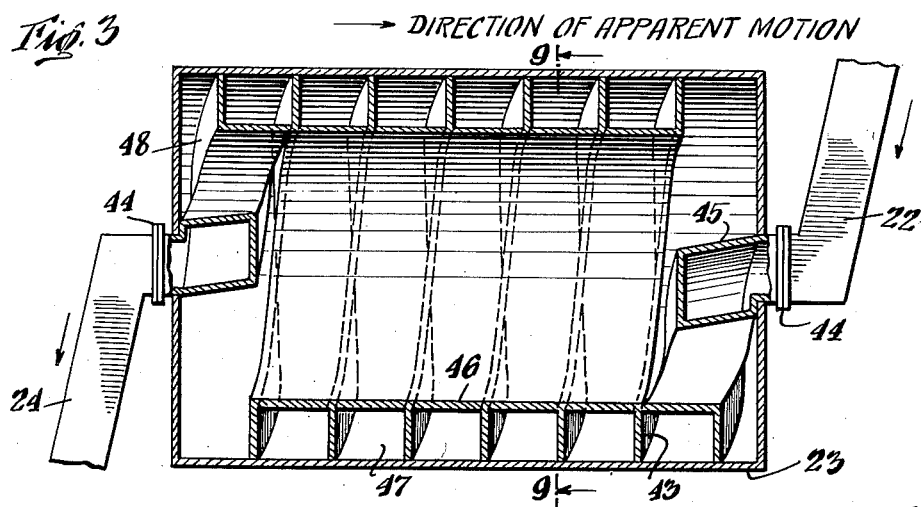

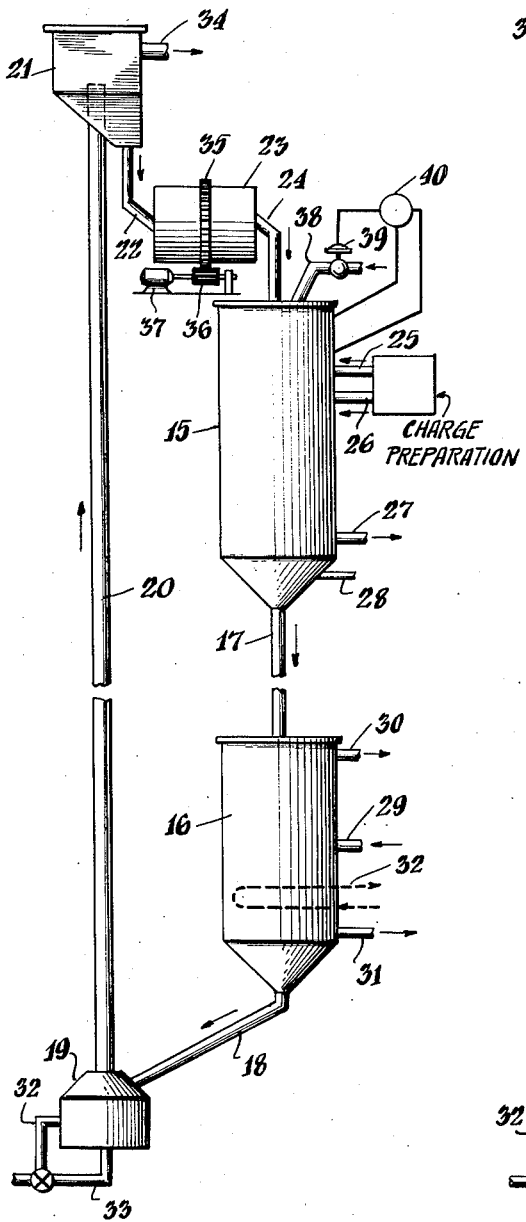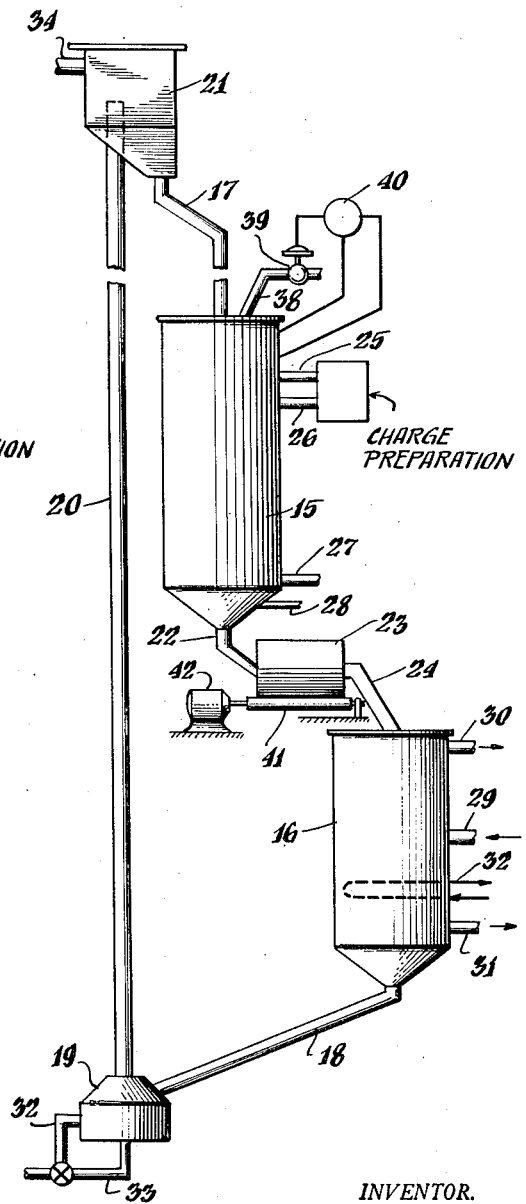

INVENTOR.
Howard W. Shea
BY
Andrew L. Jaboriault
AGENT

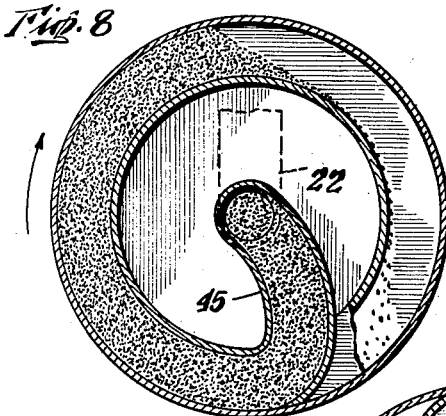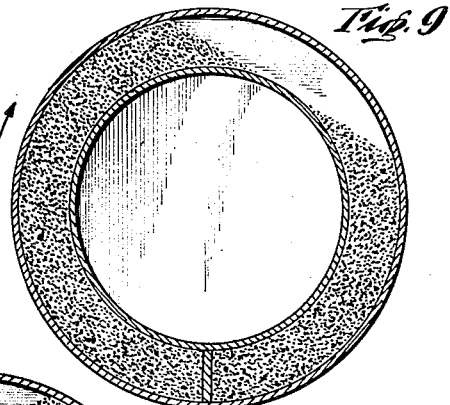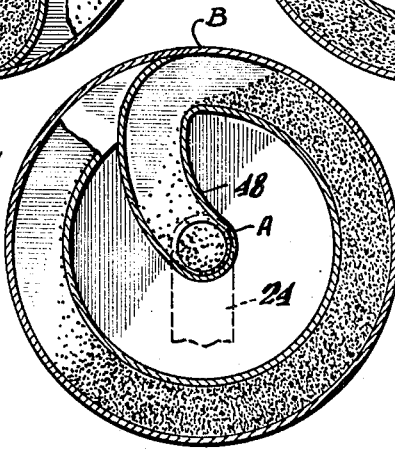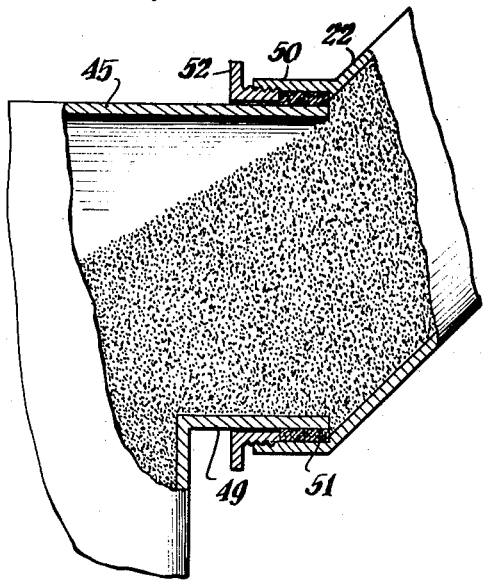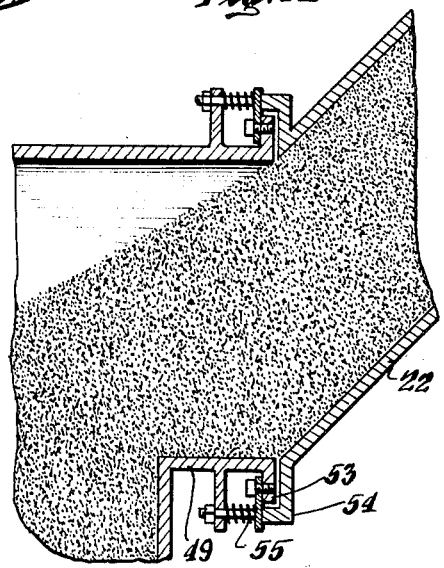

United States Patent Office 2,772,224
Patented Nov. 27, 1956

2,772,224

METHOD FOR THE TRANSFER OF GRANULAR SOLIDS BETWEEN ZONES OR VESSELS

Howard W. Shea, West Deptford Township, Gloucester County, N. J., assignor to Socony Mobil Oil Company, Inc., a corporation of New York Application April 1, 1953, Serial No. 346,196

4 Claims. (Cl. 196—52)

This invention is concerned with a method and apparatus for transferring granular solids between zones or vessels maintained at substantially different pressures. It is particularly concerned with effecting such transfer in a manner which avoids excessive passage of gaseous material between the two zones and which maintains the desired pressure in each zone.

Typical of the processes to which this invention may be applied is the catalytic cracking conversion of fluid hydrocarbons wherein a granular solid catalyst is passed cyclically through successive zones or vessels, the first of which is a conversion zone maintained at a pressure substantially above atmospheric in which the granular solids are contacted with high boiling fluid hydrocarbons to effect their conversion to lower boiling products, and the second of which is a regeneration zone at substantially atmospheric pressure in which carbonaceous contaminants deposited on the catalyst in the conversion zone are burned off by means of a combustion supporting gas.

Other exemplary processes include the catalytic reforming, aromatization, desulfurization, isomerization, and the like, of fluid hydrocarbons in the presence of a granular solid catalyst and the thermal cracking, coking, visbreaking, and the like, of fluid hydrocarbons in the presence of a granular inert solid.

Suitable granular solids which are catalytic in nature may partake of the nature of natural or treated clay, bauxite, magnesia, alumina, or synthetic associations of silica, alumina or silica and alumina, to which certain metallic oxides may be added in small amounts for specific purposes. Suitable inert granular solids may partake of the form of refractory materials, such as mullite or corhart material, stones, metallic particles or balls or particles of coke. In any case, the granular solids should be of palpable particulate form as distinguished from finely divided powders. Generally, the granular solids should be within the size range 1 inch to 100 mesh, and preferably 4 to 20 mesh by Tyler standard screen analysis. The granular solids may be in the form of pellets, tablets, spheres, capsules or other particles of regular shape, or they may be of irregular shape such as is obtained from grinding and screening operations.

In processes of the aforementioned types, as well as many others utilizing moving granular solids, it is necessary to provide some means of getting the granular solids into and out of a vessel or zone maintained at a higher pressure than the vessel or zone from or to which the solids are transferred. It is necessary to accomplish this without the loss of substantial amounts of gaseous material from the high pressure zone and in such a manner that the desired pressure is maintained in the high pressure zone. One satisfactory method for accomplishing this result is to supply or withdraw the granular solids from the higher pressure zone as a substantially compact column of restricted cross-section which is of such a length that the pressure drop thereacross is sufficient to prevent disruption or "boiling" of the column by gaseous material flowing from the higher pressure zone and likewise of sufficient length and size that the escape of gaseous material from the higher pressure zone is maintained at a relatively low level. Such a system is the subject of claims in U. S. Patent No. 2,410,309 to Simpson et al. The one disadvantage of this system is that it adds markedly to the height of the unit. For example, in a catalytic conversion system a column of 65 to 100 feet is normally used for feeding catalyst to a reactor maintained at 15 pounds per square inch gauge from a supply hopper at atmospheric pressure. This added, height, of course, adds to the cost of the structure required to support the unit. When the pressure in the reactor is much higher than 15 pounds per square inch gauge, for example, 175 pounds per square inch gauge used in one commercial catalytic reforming process, the length of the column of catalyst required to feed in this manner becomes so great as to be a practical impossibility.

A major object of this invention is to provide a method and apparatus for transferring granular solids between high and lower pressure zones or vessels which overcomes the above-described difficulty.

Another object of this invention is to provide a method and apparatus for passing granular solids between two zones or vessels, one at high pressure the other at lower pressure, without excessive transfer of gaseous material between the zones or vessels while maintaining the desired pressure in each zone or vessel, which does not add undue height to the overall structure.

Another object of this invention is the provision of a method and apparatus for feeding granular solids into a high pressure hydrocarbon reaction zone from a substantially lower pressure zone or vessel in a manner so as to avoid excessive loss of gaseous material from the zone or vessel while avoiding the addition of a large height to the structure above the zone or vessel.

A further object of this invention is to provide a method and apparatus for the removal of granular solids from a high pressure hydrocarbon conversion zone or vessel so as to avoid excessive loss of gaseous material from the high pressure zone or vessel while also avoiding the addition of a large height to the structure required below the vessel.

This invention comprises a method and apparatus for passing granular solids from a first zone to a second zone at a substantially different pressure wherein the granular solids are passed from the first zone into a confined helical passage. This helical passage may consist of a helicoid with its principal axis in a substantially horizontal plane, enclosed by inner and outer casings. The granular solids are passed through this passage in a helical path and withdrawn therefrom at a point removed from the granular solids inlet. This may be accomplished by rotating this helicoid in a direction so that it will have an apparent longitudinal movement toward the granular solids inlet. The helical passage is maintained sufficiently full of granular solids and has sufficient length that the pressure drop across the passage is sufficient to prevent disruption of the granular solids accumulation within the helical passage by gaseous material flowing through the passage between the two zones. The term "gaseous" is used herein in describing and claiming this invention to refer to a material in the gaseous phase under existing conditions of temperature and pressure, regardless of what may be its condition under atmospheric conditions.

The use of ordinary screw conveyors, wherein the screw rotates within a stationary casing, to transfer granular solids between vessels is well known to the art. But screw conveyors do not cause the granular solids to pass in a helical path, but rather, in a straight-line path. Substantial pulverizing and grinding of the granular solids occur with a screw conveyor which is avoided by this invention. The use of solids flowing in a helical path to effect chemical reactions is also old to the art, as shown by Offutt et al. in U. S. Patent No. 2,517,339. This is a widely different field than the one involved in this invention, since all that is required there is that there be intimate contact between gaseous reactant material and granular solids, while when the granular solids are introduced or removed from a zone or vessel under pressure considerations of pressure drop between inlet and outlet ends, and the length of compacted granular solids that the gaseous material must traverse, become important. Thus, for reactors as low a pressure drop as is possible across the granular solids accumulation in the reactor is desired while systems for transferring to or from a vessel under pressure, such as the present invention, as high a pressure drop across the granular solids accumulation in the system as possible is desired. Stated in another fashion, a reactor aims at providing the maximum flow of gaseous material through the granular solids accumulation therein limited only by the time required to effect the conversion while a system for removal of granular solids aims at providing a minimum flow of gaseous material through the granular solids accumulation therein which is limited only by the practical consideration of a feasible passage length. It is thus apparent that the type of method or apparatus which would function as an efficient reactor would not be an efficient transfer apparatus.

This invention will be best understood by referring to the attached drawings, of which—

Figure 1 is an elevational view of a hydrocarbon conversion system utilizing this invention to feed granular solids to the reactor.

Figure 4:
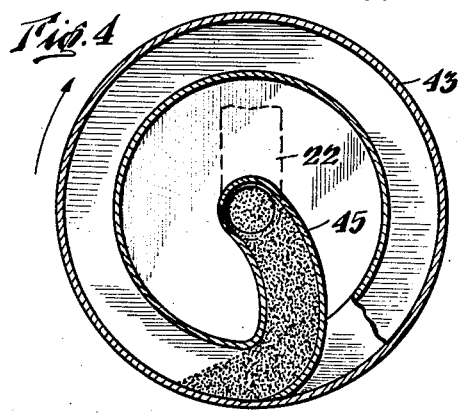
Figure 5:
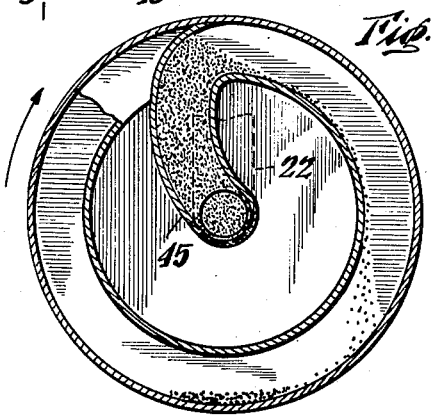
Figure 6:
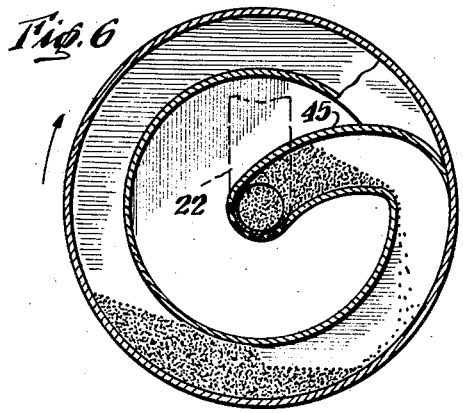
Figure 7:
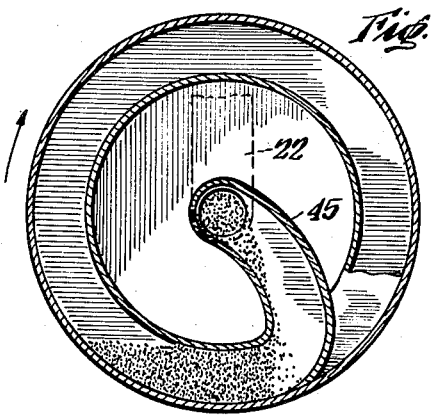

Figure 2 is an elevational view of a hydrocarbon conversion system utilizing this invention to remove granular solids from the reactor, Figure 3 is an elevational view, partially in section, of the apparatus of this invention, Figure 4 is a sectional view, taken down the center of the stationary inlet conduit, first complete turn of the helical duct in the apparatus of this invention and looking toward the outlet end when filling of the apparatus is just beginning, Figure 5 is a sectional view taken along the same line as Figure 4 but with the first inlet bend advanced 180 degrees, Figure 6 is a sectional view along the same line as Figure 4 but with the inlet bend advanced 270 degrees, Figure 7 is a sectional view along the same line as Figure 4 but with the inlet bend advanced about 330 degrees, Figure 8 is a view similar to Figure 4 but taken after the first turn of the helical duct has filled, Figure 9 is a sectional view along line 9—9 of Figure 3 when the apparatus is operated so as to run more than 50 percent full, Figure 10 is a sectional view down the stationary outlet pipe, the last bend and the last complete turn of the apparatus of Figure 2 and looking toward the inlet end when the apparatus is running more than 50 percent full, Figure 11 is an elevational view, partially in section, of a stationary inlet pipe and the end of the rotating first bend of the helicoid, showing one method that may be used to join the two, and Figure 12 is an elevational view, partially in section, similar to Figure 11 but illustrating a different method for joining the two conduits.

All of these drawings are highly diagrammatic in form and like parts in all bear like numerals.

Turning now to Figure 1, there is shown therein a reactor 15 positioned above reconditioner 16. A conventional seal leg 17 connects the lower end of the reactor to the upper end of the reconditioner. Conduit 18 extends from the lower end of the regenerator into a lift feed tank 19. A lift pipe 20 extends vertically upwardly from tank 19 into a separator 21 maintained at a level suitably above reactor 15. Conduit 22 extends from the lower end of separator 21 into one end of a helical passage maintained within a drum or casing 23. Conduit 24 extends from the opposite end of this passage into the upper end of the reactor 15.

In operation, fresh granular solids, for example, synthetic silica-alumina cracking catalyst, gravitate downwardly through a reaction zone within vessel 15, as substantially compact bed. This bed is maintained at a temperature suitable for the desired conversion, for example, about 850° F. A hydrocarbon charge, such as a reduced petroleum crude, is passed downwardly through this bed. This charge may be fractionated into a vapor portion admitted through passage 25 and a liquid portion admitted through passage 26, if desired. In a typical operation, the vapor portion of the charge might be at 850° F. while the liquid portion might be at 700° F. Likewise, in a typical catalytic conversion system, the granular catalyst might be circulated at the rate of 315 tons per hour while charge is supplied at the rate of 15,000 barrels per day. In many cases the hydrocarbon charge will be supplied entirely as a vapor. In passing through the bed, the charge is converted into lower boiling gaseous products which may contain high percentages of gasoline and fuel oil. These products are withdrawn from the lower section of reactor 15 through conduit 27. Used granular solids are purged free of adhering hydrocarbon products by means of an inert purge gas, such as steam or flue gas, admitted through conduit 28 and then passed into reconditioner 16 through seal leg 17. Where the process is a catalytic cracking conversion process, it is usually desirable to maintain the reaction zone within vessel 15 at a pressure above atmospheric, for example, 15 pounds per square inch gauge is quite common. Where the reaction is catalytic reforming, the pressure within the reaction zone will usually be much higher, for example, 175 pounds per square inch gauge. In most catalytic processes, including the two just mentioned, it is desirable to maintain reconditioner 16 in the form of a catalyst regenerator, which is most advantageously operated at or near atmospheric pressure. The column of granular solids within conduit 17 in these cases should be of sufficient length and cross-section to prevent excessive flow of gaseous material from reactor 15 to regenerator 16. In suitable designs for systems where the reaction is operated at 15 pounds pressure, conduit 17 may be over 10 feet in length. The used granular solids pass through the regeneration zone within vessel 16 as a substantially compact bed. A suitable combustion-supporting gas, such as air, is admitted centrally to this bed through conduit 29. A part of this gas flows upwardly through the upper section of the bed, while the remainder flows downwardly through the lower section of the bed to effect burning of the carbonaceous contaminants on the granular solids, which contaminants were deposited thereon by the conversion reaction. Flue gas is removed through conduits 30 and 31. In order to avoid overheating of the granular solids to a level at which they would be permanently damaged, cooling coils 32 are provided within regenerator 16 through which a suitable cooling fluid may be circulated. The heat damaging level for most commercially used catalysts is about 1200° F. Where the granular solids do not exert a catalytic effect on the hydrocarbon conversion reaction, the regenerator may take other widely different forms, for example, it may consist of an apparatus, the sole function of which is to heat the granular solids. Reconditioned granular solids are removed from the lower section of the reconditioner at a high temperature, for example, 1150° F., and passed through conduit 18 into lift tank 19. A suitable lift gas, such as air or steam, is admitted to the lift tank through conduits 32 and 33. Granular solids are suspended in this lift gas and transported thereby through lift pipe 20 upwardly into separator 21. In the separator granular solids drop out of the lift gas to the bottom of the separator while the lift gas is removed through passage 34. The separator is maintained at about the pressure in reconditioner 16, namely atmospheric pressure. Reconditioned granular solids are removed from the lower section of the separator through passage 22 and passed into one end of the helical passage around drum 23. This helical passage is continuously rotated about its principal axis by rotating drum 23, so that granular solids pass therethrough in a manner explained hereinbelow. To effect this rotation, a girth gear 35 is provided around drum 23, which engages a spur gear 36, which in turn is rotated by a motor 37. Details of the length and size of the helical passage and the extent to which it is filled with granular solids are given hereinbelow. Granular solids pass from the opposite end of the helical passage by means of a gas-tight connection into conduit 24, which supplies the granular solids to a bed maintained within a confined seal zone within the upper section of reactor 15. This seal zone is supplied with seal gas through conduit 38 at a rate controlled by diaphragm valve 39 in response to differential pressure controller 40 to maintain a pressure within the seal zone slightly above the pressure within the conversion zone therebelow. Thus, any gaseous material which flows back up to conduit 24 will be inert seal gas rather than hydrocarbon vapors. Granular solids then pass from the bed in the seal zone to the reaction bed within the reaction zone therebelow. At this point the granular solids may be, for example, at a temperature of 1050° F.

Figure 2 illustrates a hydrocarbon conversion system identical with that of Figure 1, except that in Figure 2 a conventional seal leg 17 is provided between separator 21 and the upper end of reactor 15, while the transfer system of this invention is provided between the reactor 15 and reconditioner 16. In Figure 2, the drum 23 is placed on rollers 41, which are continuously rotated by a motor 42 to effect movement of the granular solids through the helical passage around the drum. In the process of Figure 2, the inlet end of the helical passage around the drum will be the high pressure end, while in the process of Figure 1, the outlet end of the helical passage is the high pressure end.

Figures 3, 4, 5, 6, 7 and 8 illustrate the construction and operation of an apparatus suitable for conducting this invention, and they will be considered together.

Referring first to Figure 3, there is shown drum or casing 23. Within the drum and attached to its inner wall is a helicoid 43. An inner drum or core 46 is attached to the inside of the helicoid so that a helical passage or duct 47 is formed. Inlet conduit 22 connects, by a suitable joint 44, to one end of this duct, while outlet conduit 24 connects by a similar joint to the outlet end of this duct. The principal axis of the helicoid is in a substantially horizontal plane. The helicoid 43 and helical passage 47 are rotated about this axis by rotating the drum 23, by any suitable means, in a direction such that the direction of apparent motion of the helicoid is toward the inlet end of the granular solids to the helical duct. This means that if the helicoid is in the form of a right-hand screw and is rotated in a clockwise direction, as viewed from the right end, the helicoid will appear to be traveling toward the right end and the inlet conduit 22 should be located at this end. In like manner, if the helicoid is in the form of a right-hand screw and is rotated in the counterclockwise direction, as viewed from the right end, the helicoid will appear to move from right to left and the inlet conduit 22 should be at the left end. Similar relationships are obvious for the condition when the helicoid takes the form of a left-hand screw, the direction of apparent motion always being toward the inlet end.

Referring to Figure 4, the inlet end of the helical passage is shown with the inlet bend 45 pointing downwardly. When the helicoid is empty of granular solids and filling is first begun, the granular solids will fill the first bend and a small portion of the first turn, as is shown in Figure 4. As the helicoid is rotated in a clockwise direction, the inlet bend 45 will assume the position shown in Figure 5, at which point the granular solids spill downwardly and drop from the top of the inlet bend to the bottom of the first turn of the helical passage 47. Further rotation causes the first bend 45 to empty to a greater extent, the material accumulating at the bottom of the first turn, as is shown in Figure 6. The granular solids reaching the bottom are carried up the opposite side of the first turn of the helical duct by friction until the frictional forces are overcome by gravity and the solids then slide back toward the bottom of the turn. This results in the granular solids which have fallen to the bottom remaining in the upwardly moving side of the turn. When inlet bend 45 reaches the position shown in Figure 7, granular solids again flow from 22 into 45, and 45 is again filled behind the accumulation in the lower part of the first bend deposited thereby the previous filling. On the next revolution the granular solids will begin to spill over the top before the inlet bend 45 is straight up. With continuous rotation, the first bend will fill to an extent shown in Figure 8, at which time the first bend will act as a feed conduit for the second bend. This filling will transmit itself eventually through the entire helical passage until granular solids are ejected from the opposite end and pass into outlet conduit 24. Where there is no downstream restriction on flow so that the apparatus is operating at maximum capacity, it will run about fifty-one percent full of granular solids, the appearance in each bend being about like that shown in Figure 8. Now, when either the inlet or outlet end of the helical passage is at a substantially higher pressure than the opposite end, gaseous material will flow through the helical passage from one end to the other. The helical passage must be made of sufficient length that the pressure drop across the helical passage is great enough that the velocity of this gaseous material flowing through the helicoid will be below the velocity at which the accumulations of granular solids in each bend would be disrupted. Since practically all of the pressure drop is due to the accumulations of granular solids in the various bends of the helicoid, there must be sufficient turns of the helicoid to provide enough granular solids accumulations to reduce the velocity of the gaseous material below that which would disrupt or boil these accumulations.

Obviously, from the foregoing discussion, it is desirable to provide in each turn for an accumulation of granular solids as high as possible whether the apparatus is feeding to or removing from a high pressure vessel. The higher or larger the accumulation per turn the greater the pressure drop per turn and, therefore, the fewer turns that will be needed to accomplish any given pressuring or depressuring. However, the helical passage cannot be 100 percent full, obviously, or there would be no movement through it of granular solids. This is because the net gain of any granular solids particle through the passage is equal to the distance the particle falls less the distance it would have travelled as part of the helical passage. It is desirable to maintain each turn of the helical duct or passage at least about 60 percent full of granular solids, and preferably at least about 80 percent full. The appearance of any given turn will then be about like that shown in Figure 9.

The helical duct may be maintained full of granular solids to a greater extent than the minimum level at which it will operate to transfer granular solids by maintaining a suitable flow restriction, such as an orifice, weir or valve, in the stationary outlet pipe 24. More preferably, however, the level of granular solids in the helical passage is maintained at the desired high level by suitably designing the outlet bend 48, which is shown in Figures 3 and 10. Thus, the volume of the outlet bend of the helical passage or duct, that is, the volume between points A and B of Figure 10, should be sufficiently small to maintain the desired level of granular solids accumulation in each turn. This may be accomplished by making the volume of this last bend equal to a percentage of the volume of one complete turn of the helical passage determined by the formula 100 − percent fillage of each duct desired Thus, for example, if it is desired by this method to keep the helical duct 80 percent full, the volume of the last bend from A to B should be 100−80=20 percent of the volume of one complete turn of the helical duct. By this method, the duct will always be filled to the desired percentage regardless of what may happen in the vessel to which the duct is feeding. Thus, if there would be a sudden surge of contact material through passage 24, the helical duct, to fill this demand, would not empty out below the percentage for which it was designed and there would be no danger of a loss of the seal in the higher pressure vessel.

Another suitable method of design is to provide a helical duct of suitable size that the maximum throughput is greater than the throughput of the vessel to which the apparatus feeds. The helical duct in this case must feed to a compact bed or column through a stationary outlet pipe like pipe 24. Since the demand for the granular solids through pipe 24 will be less than the maximum throughput of the helical duct, the level of the granular solids in the duct will rise, because of this throttling effect, until the throughput is equal to the demand in the receiving vessel.

The most preferred method of design of the last bend and outlet system is to provide for the maximum throughput of the helical duct to be sufficiently greater than the demand of the receiving vessel that the helical duct will run filled to the desired level, say 80 percent. The outlet bend is then designed so that it will not allow the helical duct to be less full than some amount slightly below the figure which the control exerted by the receiving vessel throughput maintains, for example, 70 percent, if the normal receiving vessel throughput will control the duct 80 percent full. Thus, the demands of the receiving vessel will be met even though it may vary somewhat, but if the demands of the receiving vessel should become too excessive, the outlet bend would control the level in the helical duct so that the seal on the higher pressure vessel would not be lost.

It is apparent from the above that the length of the helical duct must always be greater than the length of a straight conduit which is capable of containing a column of granular solids of sufficient length to reduce the velocity of gaseous material flowing therethrough below the bed disruption velocity. This results from the fact that the helical duct will never be entirely full of granular solids while the straight conduit would be. How much longer the helical duct must be will depend on the degree of fillage of the duct. Thus, if it were only 51 percent full, it would have to be 49 percent longer than a straight conduit which would do the same depressuring job. If 80 percent full, the helical duct need only be 20 percent longer than the comparable straight conduit.

Suitable sealing means between stationary inlet and outlet pipes and rotating first and last turns of the helical duct can be effected in any of the ways known to the art. For example, a suitable arrangement for connecting stationary inlet 22 to the rotating first turn 45 of the helical passage is shown in Figure 11. A short cylindrical member 49 extends from turn 45 along the axis of rotation. Likewise, a short cylindrical member 50 extends from the bottom of pipe 22 along the axis of rotation of the helical passage. Cylinder 50 is of greater diameter than cylinder 49, so that a space is defined between the two into which packing 51 may be placed. This packing is compressed against the end of pipe 22 or other suitable stop by packing nut 52 to effect the gas-tight seal desired.

Another method of effecting a seal between rotating and stationary conduits of this type is shown in Figure 12. There, cylinder 49 is equipped with an open flange 53 at its outer end. A flange 54 adapted to receive flange 53 is attached to the end of pipe 22. A suitable flexible sealing material, such as brake lining, is attached to flange 53 and spring-biased against flange 54 by means of spring 55.

Many other suitable sealing means will be apparent to those skilled in the art and, of course, the same sealing means that is effective for the inlet end of the duct will be effective for the outlet end.

It is, of course, apparent that this invention will not operate when the axis of rotation of the helical duct is in the vertical plane. However, the axis of rotation need not be absolutely horizontal but may deviate therefrom to a relatively minor extent.

The rate of rotation of the helical passage governs the throughput rate of granular solids through a helical passage of any given size and granular solid level. This rate of rotation may vary over a wide range but should not be such that the granular solids are subjected to centrifugal force to a substantial degree. Obviously, if the centrifugal force becomes too great, the solids will adhere to the walls of the passage rather than moving therethrough.

The level of granular solids within the passage likewise influences the rate of throughput of the granular solids. This rate is at a maximum when this level is at a minimum, that is, when the helical passage is about 51 percent full. The throughput is decreased as the level in the helical passage is increased until, when the granular solids occupy substantially all of the passage, the rate of throughput is reduced to zero. This is true because the net gain of the granular solids with respect to the passage equals the difference between the distance the granular solids fall and the distance they would have travelled as part of the passage.

The cross-sectional area of the helical passage itself should be as small as possible consistent with obtaining the desired granular solids throughput so that the flow of gaseous material, such as seal gas, from the high pressure zone will be minimized. The horizontal cross-section of the helical passage will be, in any case, substantially less than the horizontal cross-section of the two vessels between which it transports contact material.

The length of the helical passage and the degree to which it is filled with granular solids must be adjusted in relation to each other and to the cross-section of the helical passage, so that there will be sufficient length of granular solids accumulations to avoid disruption of the granular solids accumulations by gaseous material flowing from the high pressure zone. This means that the length and degree of fillage for a given duct cross-sectional area of the helical passage must be such the pressure drop across the helical passage will be sufficient to reduce the velocity of the gaseous material flowing through the passage below the velocity at which the granular solids in the passage will be disrupted.

While the helical passage shown here amounts to one layer of helical duct wound around a central core, where the duct is quite long it may be wound as two or more layers around a central core.

In the design of the apparatus of this invention, it will generally be desirable to select a given percent fillage and then make the cross-sectional area of the helical duct the minimum possible to give the required throughput of granular solids. After this is set, the length is made sufficient to reduce the velocity of gaseous material flowing through the duct to below the disruption velocity of the granular solids.

Following are two examples of suitable constructions of helical passages designed to supply a granular catalyst to, in the first case, a catalytic cracking unit, and in the second case, a catalytic reformer from a lower pressure vessel:

|  | Cracking Unit | Reformer |
|---|---|---|
| Pressure Drop Across Helical Passage, lb./sq. in. | 13 | 175 |
| Catalyst Density (loose packed) g./cc. | 0.68 | 0.9 |
| Catalyst Temperature, °F. | 1,050 | 1,050 |
| Percent of Helical Duct Volume Occupied by Catalyst | 80 | 80 |
| Maximum Flow of Seal Gas Through Duct, Percent of Boiling Rate | 75 | 75 |
| Rate of Rotation of Helical Duct, rev./min. | 12 | 12 |
| Internal Diameter of Helical Duct, ft. | 6 | 7.4 |
| Length of Sides of Duct (square cross-section): | | |
| High Pressure End, in. | 25 | 6 |
| Low Pressure End, in. | 32 | 13 |
| Length of Helical Duct, ft. | 90 | 913 |
| Approximate Length of Duct Unit Measured Down its Principal Axis, ft. | 12 | 33 |
| Volume of Catalyst Delivered, cu. ft./rev. | 22.9 | 1.24 |
| Seal Gas Required, lb./hr. (steam) | 1,225 | 250 |

In the above examples, only one layer of duct was used. The cracking unit was designed to process about 15,000 barrels per day of a reduced petroleum crude to obtain a gasoline-containing product at a catalyst circulation rate of about 350 tons per hour, while the reforming unit was designed to process about 10,000 barrels per day of petroleum naphtha to produce a high octane-blending stock at a catalyst circulation rate of about 25 tons per hour.

This invention should be understood to include all changes and modifications of the examples of the invention herein chosen for purposes of disclosure which do not constitute departures from the spirit and scope of the invention.

I claim:

1. In a cyclic catalytic conversion process wherein a granular catalyst is continuously cycled between a high pressure conversion zone wherein the granular catalyst is contacted with a fluid hydrocarbon charge to effect the conversion thereof and a confined regeneration zone at a substantially lower pressure than the conversion zone wherein the carbonaceous contaminants deposited on the catalyst in the conversion zone are removed by burning, the improved method of passing the catalyst from the regeneration zone into the conversion zone so as to maintain the required pressure in each, which comprises: passing catalyst from the regeneration zone into one end of a confined helical passageway with principal axis maintained in a substantially horizontal plane, rotating said passage about its principal axis so as to effect movement of the catalyst through the passage in a helical path away from the point of introduction and in a direction opposite to the direction of the apparent motion, maintaining an enclosed seal zone above the conversion zone and maintaining a substantially compact bed of catalyst within the seal zone, supplying seal gas to the seal zone to maintain the pressure therein slightly in excess of the pressure in the conversion zone, discharging the catalyst from the helical passage and passing the catalyst downwardly onto the surface of the bed in the seal zone through a confined gas-tight passage, maintaining the last bend of the helical passage before discharge of the catalyst of sufficiently reduced size that the helical passage will be maintained at least 60 percent full of catalyst at all times, maintaining the length of the helical passage between the point of entry and discharge of catalyst sufficient to prevent disruption of the catalyst accumulation within the helical passage due to seal gas flow through the helical passage from the seal zone when the level of catalyst in the helical passage is at the minimum permitted by the last bend of the passage, controlling the rate of rotation of the helical passage so that when the level of granular solids is at the minimum permitted by the last bend, the flow of catalyst through the helical passage will be in excess of the maximum contemplated flow through the conversion zone and passing catalyst from the lower section of the bed in the seal zone into the conversion zone.

2. The process of claim 1 further limited to controlling the rotation of the helical passage so as to maintain the bed surface in the seal zone up to the level of the lower end of the enclosed discharge pipe from the helical passage at the particular catalyst circulation rate involved when the helical passage is about 80 percent full of catalyst.

3. A method for supplying granular solids to a high pressure catalytic conversion zone from a substantially lower pressure zone, which comprises: passing the granular solids from the lower pressure zone into one end of a confined helical passageway with principal axis in a substantially horizontal plane, rotating said passage about its principal axis so as to effect movement of the solids through the passage in a helical path away from the point of introduction and in a direction opposite to the direction of the apparent motion, maintaining a confined seal zone above the conversion zone, maintaining a substantially compact bed of granular solids within the seal zone, supplying seal gas to the seal zone so as to maintain the pressure therein slightly above the pressure in the conversion zone, discharging granular solids from the opposite end of said helical passage and passing the solids so discharged onto the surface of the bed in the seal zone through a gas-tight passage, controlling the volume of the last bend of the passage before the granular solids are discharged so as to maintain a helical passage of at least 60 percent full of granular solids, maintaining the helical passage of sufficient length to prevent disruption of the granular solids accumulation therein by seal gas flowing through from the seal zone, controlling the rate of rotation of the helical passage sufficient to maintain the upper surface of the bed in the seal zone at a level adjacent the lower end of the discharge passage when the helical passage is at least 60 percent full of granular solids and continuously removing granular solids from the lower section of the bed and passing them into the conversion zone.

4. A method as defined in claim 3, wherein the helical passage is maintained at least 80% full of granular solids.

References Cited in the file of this patent

UNITED STATES PATENTS

| 1,381,936 | Schieffelin | June 21, 1921 |
| 2,457,461 | Graae | Dec. 28, 1948 |
| 2,566,285 | Evans | Aug. 28, 1951 |